United States Patent [19]
Bixby

[11] 3,948,293
[45] Apr. 6, 1976

[54] HOSE CONSTRUCTION AND UTILIZATION
[75] Inventor: Ezra Lovell Bixby, Pennington, N.J.
[73] Assignee: Goodall Rubber Company, Trenton, N.J.
[22] Filed: Apr. 19, 1974
[21] Appl. No.: 463,076

Related U.S. Application Data
[63] Continuation of Ser. No. 271,460, July 13, 1972, abandoned, which is a continuation-in-part of Ser. No. 96,987, Dec. 10, 1970, abandoned.

[52] U.S. Cl. ................................. 138/126; 138/178
[51] Int. Cl.² .......................................... F16L 11/10
[58] Field of Search ..................... 138/125, 126, 178

[56] References Cited
UNITED STATES PATENTS

| | | | |
|---|---|---|---|
| 2,383,733 | 8/1945 | Parker | 138/126 |
| 2,830,919 | 4/1958 | Schalzel | 117/232 |
| 3,018,800 | 1/1962 | Hanssens | 138/125 |
| 3,034,943 | 5/1962 | Cravatta | 138/178 |
| 3,184,522 | 5/1965 | Zagar | 260/889 |
| 3,245,431 | 4/1966 | Coe | 138/125 |
| 3,604,461 | 9/1971 | Mathews | 138/125 X |

FOREIGN PATENTS OR APPLICATIONS
753,941  3/1967  Canada .............................. 138/125

Primary Examiner—Richard C. Queisser
Assistant Examiner—Charles Gorenstein
Attorney, Agent, or Firm—Beveridge, DeGrandi, Kline & Lunsford

[57] ABSTRACT

A hose has an extruded tube formed of a blend of polyethylene and butyl rubber, a braided external reinforcement layer and a film applied by coating to unify and give dimensional stability to the elements of the cover. The hose is used in LP gas installations due to the non-leaching and heat-resistant characteristics of the tube material.

7 Claims, 1 Drawing Figure

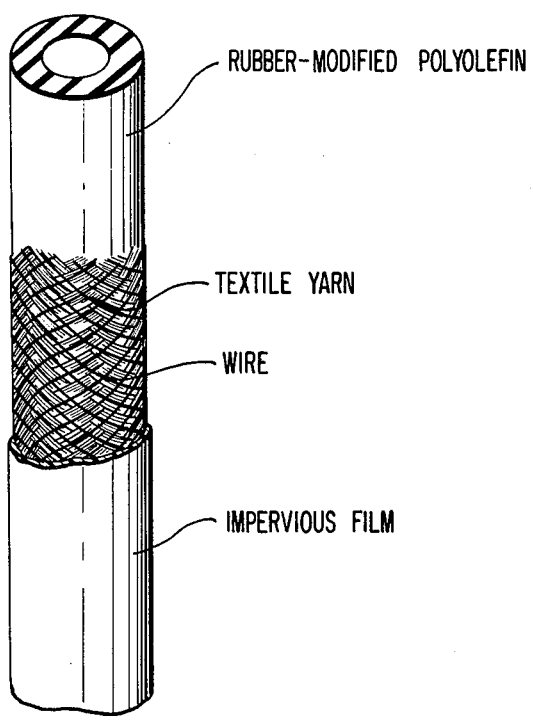

HOSE CONSTRUCTION AND UTILIZATION

This is a continuation of application Ser. No. 271,460 filed July 13, 1972 which was a continuation-in-part of earlier application Ser. No. 96,987, filed Dec. 10, 1970, both now abandoned, which is relied upon and the entire disclosure and specification of which is hereby incorporated by reference.

This invention relates to a reinforced hose construction which is novel from the standpoint of the method by which it is manufactured, the physical relationship of its elements, the chemical compositions from which it is made and its ultimate use in liquefied petroleum gas apparatus.

The invention also pertains to hoses made from a particular group of chemical compositions in combination with liquefied petroleum gas (LPG) apparatus where there has been a need for hose which may be manufactured relatively inexpensively yet is non-leaching so that LP gas will not extract foreign matter from the hose to interfere with the operation of a carburetor or other gas-utilizing or transporting apparatus and capable of being exposed to the temperature extremes normally encountered in such apparatus where the same hose can be exposed to low temperatures resulting from cold weather and high temperatures resulting from their proximity to various types of burners, engines, and other heat-generating combustion devices. This phase of the invention involves a hose made of a rubber modified polyolefin used for carrying the LP gas along all or part of a flow path which includes an LP gas storage tank, a pressure regulator for converting the LP gas from the liquid to a vapor state and a combustion device for burning the vapor. Preferably, the hose is a blend which includes polyethylene and butyl rubber in respective proportions of about 2:1. The hose is particularly well suited for this purpose and is significantly less expensive than materials such as nylon which are also suitable for such environments.

A hose of this invention may be made by advancing an elongated tubular body along its longitudinal axis, braiding a reinforcement cover over substantially the entire exterior surface of the tubular body, and then forming a film which unifies the elements of the cover and forms a barrier rather than serving the principal purpose of attaching the cover to the tubular body. Preferably, this film is formed by immersing the tubular body after the braiding step in a coating bath which includes a solvent capable of subsequent evaporation under normal atmospheric conditions. The resulting product which is a related aspect of the invention is a tubular body of flexible material which has a fluid-carrying passage therewithin, a cover of textile yarns surrounding the tubular body and conforming to the external surface thereof, and a film which covers the textile braid to unify the cover and provide the outermost exposed surface of the hose.

Among the many objects satisfied by the present invention are to provide a strong, flexible hose which lends itself readily to acceptance of conventional hose fittings, is capable of withstanding high internal pressures without bursting, and resists deterioration resulting from internal exposure to LP gas and external exposure to sunlight, temperature extremes, petroleum products and normal wear.

Another object is to provide a new method of making hose which is less complicated and is less expensive than previous methods yet produces a hose which is equal or superior in quality to hose made by previous methods.

The manner in which this invention achieves these and other objects will be evident from a study of the following description which sets forth a preferred embodiment of the invention. The manufacture of the hose commences with an extruding step of a known type wherein plastic granules are forced through a screw extruder where they are changed into a flowable mass and discharged through an annular orifice to form a dimensionally stable plastic hose. The composition of the tubing is discussed in detail in a later portion of this specification. This tubing, unlike extruded rubber tubing, possesses its final physical characteristics and is not later subjected to curing or vulcanizing operations.

The tube is then passed through a braider which applies a braided reinforcement cover which surrounds the tube and conforms to its external surface. The helix angle of the braid may range from about 30° to about 50° depending on the characteristics desired for the completed hose. Since the hose may be subjected to high internal pressure, it is desirable to cover substantially all of the external wall of the tube with a textile braid so that the tube will not be visible and there will be no localized areas of weakness where bursting may occur. A layer of wire braid may be placed over the textile braid to strengthen the hose further.

The next step involves formation of film which unifies the elements of the cover and provides a barrier surrounding the tube. The term "film" has been used herein to describe a continuous and uninterrupted body and does not imply the existance of a uniform thickness. Preferably, the film is formed by passing the tube, after the braiding operation, through a liquid coating bath which includes a plastic film-forming material in a solvent, squeezing the excess liquid from the structure after it leaves the bath and permitting the solvent to evaporate and leave the film. The solvent in the coating bath normally will not have a solvating effect on the tube itself or on the material which forms the reinforcement cover. The film may also be formed by wetting the tubing with the same coating material prior to the braiding operation, so the coating material will strike outwardly through the braid and then permitting the solvent to evaporate subsequent to the braiding operation to form the film.

The hose made by this process has the flexible tube surrounded by a braided cover which conforms to the external surface of the tube, with the cover being unified by the film. The film is stretchable and elastic to an extent which will permit normal flexing of the hose in use. It is not essential that the cover or the film be adhered to the tube since the unified cover provides the necessary resistance to burst and prevents radial fraying of the cover when the hose is cut. When the film forming material is applied to the tube prior to the braiding step, it contacts the external surface of the tube and possesses a greater modulus of friction than the materials which form the cover. The resulting frictional resistance to axial movement of the cover along the tube will simplify the task of slipping on an axially-applied fitting.

The tube material is a rubber-modified polyolefin. Some compounds in this group are disclosed in U.S. pat. No. 3,184,522 which is material sold by Allied Chemical Corporation, Plastics Division, and identified as their ET 2A polymer. This material is a blend of polyethylene and butyl rubber with about 65% polyethylene and 35% butyl rubber by weight. The ratio of polyethylene to butyl rubber is about 2:1 by weight. This material has been proven to be non-leaching in an liquefied petroleum gas system and its usable properties are preserved up to 250°F. This raw material is furnished in pellet form. Fillers and modifiers may be added provided they do not destroy the required physical and chemical characteristics of the material. The material is, for example, extruded to form a tube having a nominal size of three-eighth inch, an inside diameter of 0.380 inch and an outside diameter of 0.600 inch, providing a wall thickness of 0.110 inch. The rubbery characteristics of this material dictate some efforts to avoid stresses while in its heated and and flowable state by the use of dies which have a relatively smooth entry and short lands. Preferably, die temperatures should exceed the melt temperatures.

Characteristics of an acceptable tube material are as follows:

| | | |
|---|---|---|
| Tensile Strength | (ASTM D-412) | 2400–2600 psi |
| Elongation % | | 350 – 400 |
| Tensile Yield | | 800 – 1200 |
| Environmental Stress Crack BTL $F_{50}$ Test | (ASTM D-1693) | 400 hours |
| Tear Resistance Die "C", .075 Slab | (ASTM D-624-54) | 300 lbs/in² |
| Compression Set | (ASTM D-395-61 | |
| 158°F 22 Hrs. | | 33% |
| 212°F 22 Hrs. | | 37% |
| Flexural Modulus | (ASTM D-796-58) | 6,000 |
| Viscosity Mooney MS 300°F | (ASTM D-1646-63) | 30 |
| Heat Deflection °F Randall-Stickney Compression | | 250°F |
| Heat Aging 212°F 4 Days | (ASTM D-753-53) | |
| tensile retained | | 78% |
| elongation retained | | 86% |
| Heat Aging - 250°F 4 Days | (ASTM D-753-53) | |
| tensile retained | | 70% |
| elongation retained | | 100% |
| Durometer Hardness | | |
| Shore A | (ASTM D-1706-61) | 97 |
| Shore D | (ASTM D-1484) | 56 |
| Resilience (Recovery - Tension; Rebound - Scleroscope) | | 37 |
| Relative Flow ET Polymers Spiral Flow 340°F – 350°F | | 9.75" |
| Brittleness Temperature | (ASTM D-746-57T) | –50°C. |
| Low Temperature Impact | | |
| Specific Gravity | | .923 |

The reinforcement cover is preferably braided of textile yarns such as 4200 denier nylon which are applied to the tube by standard 24 carrier braider. As previously mentioned, the braided cover should substantially completely cover the tube so that the tube is not visible and there will be no localized areas of weakness which would be susceptible to bursting. Other synthetic textile materials such as polyester fibers and blends of nylon and polyester may be used.

A layer of wire reinforcement may be applied externally of the textile braid in order to increase the bursting strength of the hose. Preferably, this reinforcement is 0.012 inch stainless steel wire which is applied to the hose by a 24 carrier braider. A single strand of wire is applied by each carrier in a manner whereby about 12 percent of the external area hose is covered by the wire. This wire braid may be applied either before or after the external cover of the hose is applied.

A suitable film-forming material is a plastic in a solution of vaporizable solvent which permits process operations at room temperatures; however, it is possible to apply a polymer film or coating by a hot dip process. The preferred solvent-including composition is identified by No. 60-292 by its manufacturer, Chemical Coatings Corporation, Rocky Hill, Conn. Preferably, the external barrier film adheres to but does not penetrate appreciably into the braided reinforcement, and its greatest thickness occurs at the junctures of oppositely-wound yarns of the textile braid.

It has been found that it is advantageous to use a film-forming material which differs in color from the braided cover. In addition to improving the appearance of the product, the color difference also simplifies quality-control inspection since voids in the film will produce noticeable color discontinuities readily detectable by optical inspection. This inspection may be performed visually by a worker or mechanically by a photoelectric system. A blue polyester paste available from Harwick Chemical Company has been used to provide such color and is compatible with the preferred film-forming material described above.

In the completed hose, the wall thickness of the main tubular body is considerably greater than the thickness of the external layers of the hose, with the wall thickness of the tubular body preferably being at least about ten times as great as the thickness of any of the layers of textile braid, wire braid or external film.

As previously mentioned, a very important feature of the invention is that the tube is made of a material which is non-leaching when used to carry liquefied petroleum gas (LPG), thereby avoiding possible contamination of burners, carburetors and other elements in the system. Also important is its resistance to high temperatures, particularly of the type encountered under the hood of an engine or otherwise in the vicinity of combustion of the LP gas.

In view of the unique adaptability of this improved hose to the LP gas industry, the invention is considered to include the combination of the rubber-modified polyolefin tube with a storage tank containing LP gas, a pressure regulator for converting the LP gas from a liquid to a vapor state, and a combustion device for burning the vapors wherein the hose carries the LP gas in the flow path between the tank and the combustion device. The hose of this invention may be used to carry the liquid from the storage tank to the regulator or from the regulator to the carburetor. A specific use is in connection with combustion devices in the form of internal combustion engines which have carburetors which mix the LP gas vapors with ambient air. Literature on such carburetors, the engines with which they are associated and the manner in which hoses are connected thereto are set forth in the patents and literature of J & S Carburetor Company, P.O. Box 10391, Dallas, Tex. 75207, typified by their forms 1279 and 1207B which are incorporated herein by reference. The hose may also be used for other LP gas installations where the fuel is fed to other combustion devices such as burners, salamanders, weed burners, heaters and noise making machines used as scarecrows.

Those skilled in the art will appreciate that the invention described herein constitutes a departure from conventional practice in hose manufacture and structure and in the conveying of liquid or vapor in an LP gas system. Since numerous modifications may be made to the invention as described herein without departing from the inventive concept, it is stressed that the invention is to be construed in the light of the claims which follow rather than according to the specific embodiments set forth hereinabove.

I claim:

1. A plastic hose comprising:
a tubular body of an extrudable composition of polyethylene and butyl rubber having a fluid-carrying passage therewithin, said composition having a ratio by weight of polyethylene to butyl rubber of about 2:1,
a tubular braided cover of textile yarns surrounding the tubular body and conforming to the external surface thereof, a film surrounding the cover to unify the elements of the cover and provide an impervious barrier at the outermost exposed surface of the hose.

2. A hose according to claim 1 wherein neither the film nor the cover are bonded to the external surface of the tubular body.

3. A hose according to claim 1 wherein the film has a different color from the textile yarns of the cover to facilitate visual detection of undesired discontinuities in the film.

4. A hose according to claim 1 wherein the cover is a tubular braided element which covers the entirety of the exterior surface of the tubular body.

5. A hose according to claim 4 wherein neither the film nor the cover are bonded to the external surface of the tubular body.

6. A hose according to claim 4 wherein the film has a different color from the textile yarns of the cover to facilitate visual detection of undesired discontinuities in the film.

7. A hose according to claim 6 wherein neither the film nor the cover are bonded to the external surface of the tubular body.

* * * * *